(12) United States Patent
Koshiba et al.

(10) Patent No.: US 10,145,690 B2
(45) Date of Patent: Dec. 4, 2018

(54) MAP INFORMATION GENERATION SYSTEM, METHOD, AND PROGRAM

(71) Applicant: AISIN AW CO., LTD., Anjo-shi, Aichi-ken (JP)

(72) Inventors: Sadahiro Koshiba, Takahama (JP); Morihiro Hirate, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/124,565

(22) PCT Filed: Sep. 19, 2014

(86) PCT No.: PCT/JP2014/074822
§ 371 (c)(1),
(2) Date: Sep. 8, 2016

(87) PCT Pub. No.: WO2015/145819
PCT Pub. Date: Oct. 1, 2015

(65) Prior Publication Data
US 2017/0016731 A1 Jan. 19, 2017

(30) Foreign Application Priority Data
Mar. 24, 2014 (JP) ................. 2014-060489

(51) Int. Cl.
*G01C 21/30* (2006.01)
*G06F 17/30* (2006.01)
(Continued)

(52) U.S. Cl.
CPC ............. *G01C 21/30* (2013.01); *G01C 21/20* (2013.01); *G01C 21/32* (2013.01);
(Continued)

(58) Field of Classification Search
CPC ........ G01C 21/30; G01C 21/20; G01C 21/32; G06F 17/30241; G09B 29/10; G09B 29/106
See application file for complete search history.

(56) References Cited

U.S. PATENT DOCUMENTS 5,383,128 A * 1/1995 Nishida ................. G01C 21/26
340/990
5,774,824 A * 6/1998 Streit ..................... G01C 21/30
340/990
(Continued)

FOREIGN PATENT DOCUMENTS

EP 0 921 509 A2 6/1999
EP 1 939 589 A1 7/2008
(Continued)

OTHER PUBLICATIONS

Jan. 30, 2017 Supplementary Search Report issued in European Patent Application No. 14886973.8.
(Continued)

*Primary Examiner* — Tuan C To
(74) *Attorney, Agent, or Firm* — Oliff PLC

(57) ABSTRACT

Map information generation systems, methods, and programs acquire a movement track of a mobile body, and correct a position of the movement track such that the movement track approaches an existing road. The systems, methods, and programs acquire a section in which the corrected movement track does not correspond to the existing road as a new road, and add information that indicates the new road to map information.

13 Claims, 4 Drawing Sheets

(51) Int. Cl.
  *G01C 21/20* (2006.01)
  *G01C 21/32* (2006.01)
  *G09B 29/10* (2006.01)
(52) U.S. Cl.
  CPC ....... *G06F 17/30241* (2013.01); *G09B 29/10* (2013.01); *G09B 29/106* (2013.01)

(56) References Cited

U.S. PATENT DOCUMENTS

| | | | |
|---|---|---|---|
| 6,023,653 A * | 2/2000 | Ichimura | G01C 21/30 |
| | | | 701/446 |
| 6,381,533 B1 | 4/2002 | Crane et al. | |
| 6,470,265 B1 * | 10/2002 | Tanaka | G01C 11/00 |
| | | | 701/532 |
| 9,212,919 B2 | 12/2015 | Kanematsu | |
| 2007/0179646 A1 * | 8/2007 | Dempski | G06Q 10/10 |
| | | | 700/83 |
| 2007/0213927 A1 | 9/2007 | Ishigami et al. | |
| 2008/0119965 A1 * | 5/2008 | McCrary | B60O 7/00 |
| | | | 701/2 |
| 2010/0125408 A1 * | 5/2010 | Shikimachi | G01C 21/32 |
| | | | 701/533 |
| 2010/0179755 A1 | 7/2010 | Kohno et al. | |
| 2011/0238294 A1 | 9/2011 | Shikimachi et al. | |
| 2012/0197525 A1 * | 8/2012 | Noro | G09B 29/106 |
| | | | 701/437 |
| 2013/0096829 A1 * | 4/2013 | Kato | G01C 21/32 |
| | | | 701/533 |
| 2014/0278055 A1 * | 9/2014 | Wang | G01C 21/32 |
| | | | 701/409 |
| 2015/0058427 A1 * | 2/2015 | Grignon | H04W 4/02 |
| | | | 709/206 |
| 2015/0142306 A1 * | 5/2015 | Kanematsu | G01C 21/30 |
| | | | 701/461 |

FOREIGN PATENT DOCUMENTS

| | | |
|---|---|---|
| EP | 2 400 268 A1 | 12/2011 |
| EP | 2 664 894 A2 | 11/2013 |
| JP | 2001-264092 | 9/2001 |
| JP | 2004286641 A * | 10/2004 |
| JP | 2005201856 A | 7/2005 |
| JP | 2007-271602 A | 10/2007 |
| JP | 2009-192480 A | 8/2009 |
| JP | 2010014658 A * | 1/2010 |
| JP | 4559551 B2 | 10/2010 |
| JP | 2011-196195 A | 10/2011 |
| WO | 2013/183252 A1 | 12/2013 |

OTHER PUBLICATIONS

Dec. 16, 2014 Search Report issued in International Patent Application No. PCT/JP2014/074822.

* cited by examiner

MAP INFORMATION GENERATION SYSTEM, METHOD, AND PROGRAM

TECHNICAL FIELD

Related technical fields include map information generation systems, methods, and programs that generate information on a new road.

BACKGROUND ART

There have hitherto been known technologies for generating information on a new road that is not present in map information on the basis of a travel history of a vehicle. For example, Japanese Patent No. 4559551 discloses a configuration in which the position of a vehicle and a geographical database are matched with each other to decide the splitting position of a link for which matching was previously established from the initial position at which matching is not established to create a new link that has the splitting point as an end point. Meanwhile, Japanese Patent Application Publication No. 2009-192480 (JP 2009-192480 A) discloses a configuration in which a track obtained in a state in which the position on a road cannot be estimated is translated, rotated, and enlarged such that the start point and the end point of the state in which the position on a road cannot be estimated match a location obtained immediately before the state in which the position on a road cannot be estimated is established and a location obtained immediately after a state in which the position on a road can be estimated is established, respectively.

SUMMARY

In the technologies according to the related art discussed above, the position of a new road is occasionally inaccurate. That is, in the technology disclosed in Japanese Patent No. 4559551, in which the splitting position of a link for which matching was previously established is decided from the initial position at which matching is not established, the initial position at which matching is not established is not necessarily accurate. Thus, if the splitting position of a link is decided on the basis of the initial position at which matching is not established, the position of the new road may be inaccurate.

In the technology disclosed in JP 2009-192480 A, in which a track is corrected such that the start point and the end point of the state in which the position on a road cannot be estimated match the location immediately before the state in which the position on a road cannot be estimated is established and the location immediately after the state in which the position on a road can be estimated is established, respectively, the location immediately before the state in which the position on a road cannot be estimated is established and the location immediately after the state in which the position on a road can be estimated is established are not necessarily accurate. Thus, the position of the new road may be inaccurate. In a map matching process in which a detected position is estimated as a position on a road, in addition, the detected position is compulsorily converted into a position on a road. Therefore, even if a position on a road is estimated, the position is occasionally different from the accurate position of the vehicle.

Exemplary embodiments of the broad inventive principles described herein address the foregoing issue, and therefore have an object to provide a technology that improves the accuracy in position of a new road.

In order to achieve the foregoing object, exemplary embodiments provide map information generation systems, methods, and programs that acquire a movement track of a mobile body, and correct a position of the movement track such that the movement track approaches an existing road. The systems, methods, and programs acquire a section in which the corrected movement track does not correspond to the existing road as a new road, and add information that indicates the new road to map information.

With the map information generation system, method, and program, as described above, the movement track is corrected so as to approach the existing road, and thereafter a section that does not correspond to the existing road is acquired as a new road. In the current technologies for specifying the position of the mobile body (technologies that utilize GPS, gyro, or the like), the position is occasionally inaccurate because of various factors such as radio disturbance and error accumulation. Therefore, when a focus is placed on the position of the mobile body specified at a certain moment, the position is occasionally inaccurate, and if the position of connection between a new road and the existing road is specified on the basis of the above position, the position of the new road is inaccurate.

In this way, the position of the mobile body, which constitutes the movement track of the mobile body, may be inaccurate. When a focus is placed on the shape of the movement track in a state in which the movement track is constituted from a plurality of positions of the mobile body, on the other hand, the shape of the movement track is rarely different from a track of the actual position significantly. In the GPS technology, for example, the position may be fluctuated at random because of multipath propagation and noise. When a focus is placed on the movement track which is a collection of a plurality of positions, however, the error is leveled, and the shape of the movement track is rarely different from a track of the actual position significantly. Thus, in the map information generation system, method, and program, the position of connection between a new road and the existing road is not specified on the basis of the specific position of the mobile body, but the movement track is corrected so as to approach the existing road, and thereafter a section of the movement track that does not correspond to the existing road is specified as a new road. Therefore, the accuracy in position of the new road can be improved.

DETAILED DESCRIPTION EXEMPLARY EMBODIMENTS

Hereinafter, embodiments will be described in the following order:
(1) Configuration of Map Information Generation System
(2) Map Information Generation Process
(3) Other Embodiments

(1) Configuration of Map Information Generation System

Figure 1:
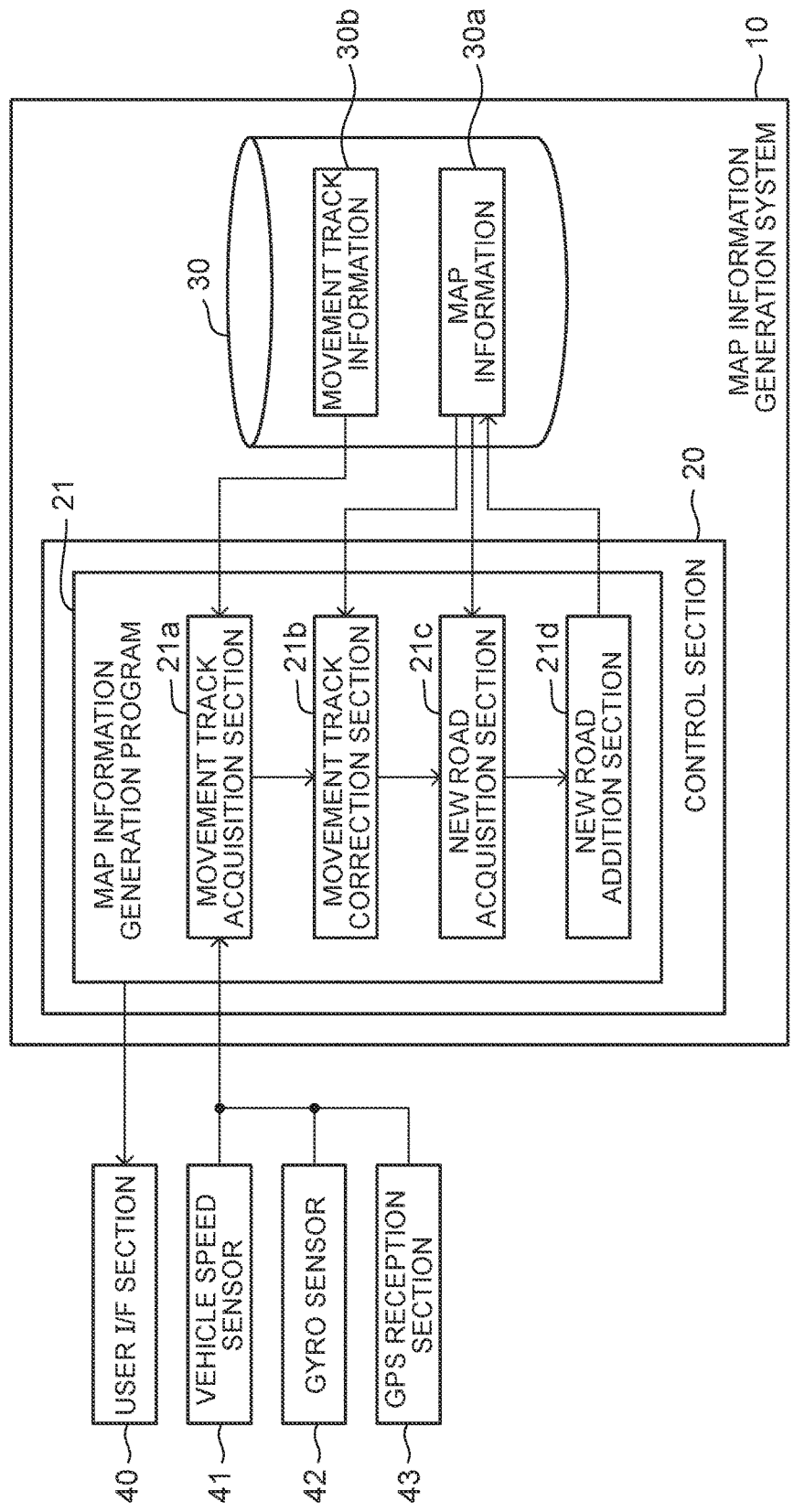
FIG. 1 is a block diagram illustrating a map information generation system.
Figure 2:
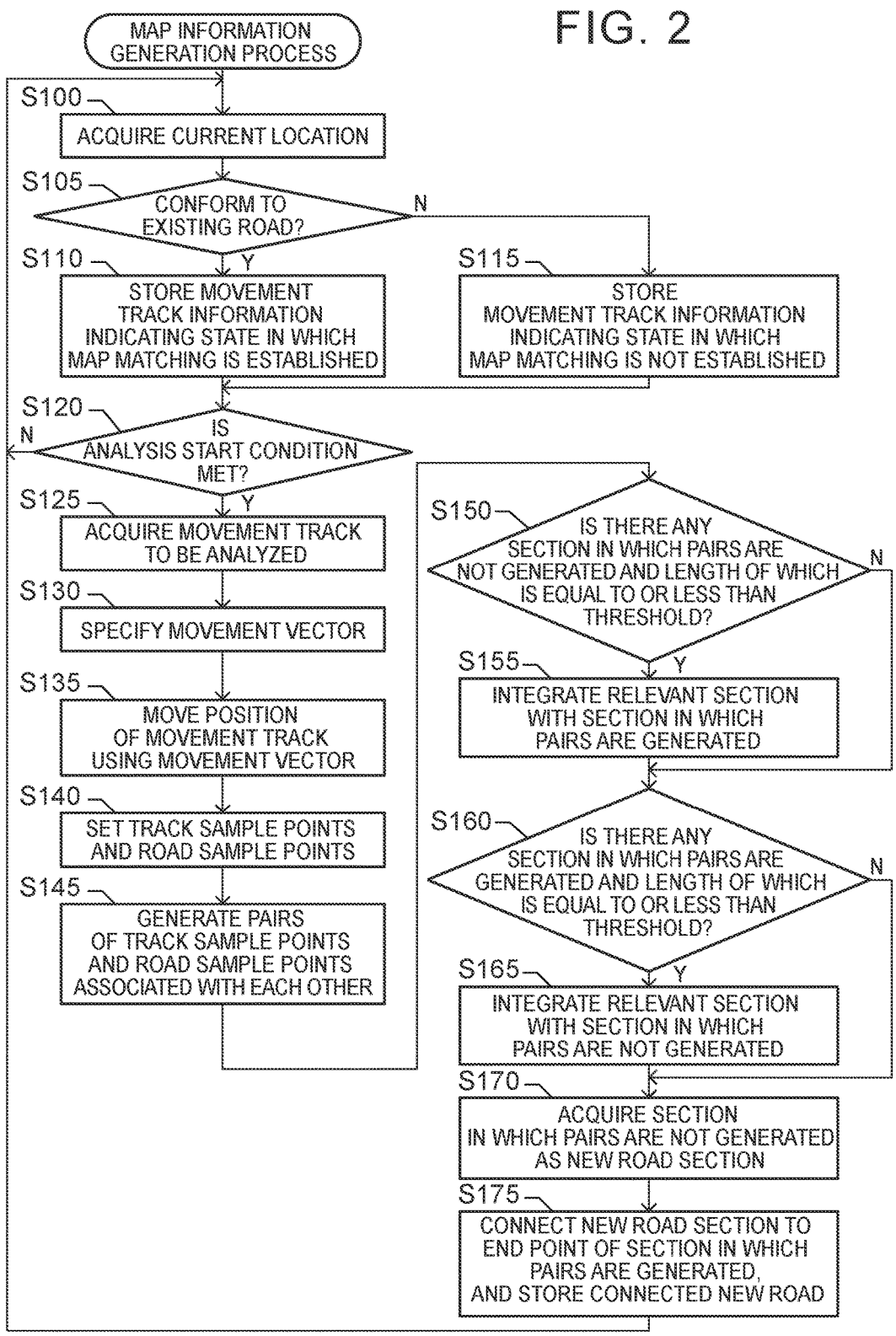
FIG. 2 is a flowchart illustrating a map information generation process.

FIG. 1 is a block diagram illustrating the configuration of a map information generation system 10. The map information generation system 10 includes a control section 20 that includes a CPU, a RAM, a ROM, and so forth, and a storage medium 30. (As used herein the term "storage medium" are not intended to encompass transitory signals.) The control section 20 can execute programs stored in the storage medium 30 and the ROM. In the embodiment, a navigation program and a map information generation program 21 can be executed as the programs. The navigation program has a function of performing a map matching process on the basis of autonomous navigation information to specify the position of a vehicle (mobile body) on a road and display the current location of the vehicle on a map.

The storage medium 30 stores map information 30a in advance. The map information 30a is information utilized to specify the current location of the vehicle or the like, and includes node data indicating the positions of nodes set on roads on which the vehicle travels, shape interpolation point data for specifying the shape of the roads between the nodes, link data indicating coupling between the nodes, feature data indicating the positions and the types of features existing on or around the roads, and so forth.

The vehicle on which the map information generation system 10 according to the embodiment is mounted includes a user I/F section 40, a vehicle speed sensor 41, a gyro sensor 42, and a GPS reception section 43. The user I/F section 40 is an interface section that receives input of an instruction from a user and that provides various kinds of information to the user, and includes a display section that also serves as an input section constituted of a touch panel display (not illustrated), and an output section for output sound such as a speaker. The GPS reception section 43 receives radio waves from GPS satellites to output a signal for calculating the current location of the vehicle to the control section 20 via an interface (not illustrated). The vehicle speed sensor 41 outputs a signal corresponding to the rotational speed of wheels of the vehicle to the control section 20. The gyro sensor 42 outputs a signal corresponding to angular acceleration acting on the vehicle to the control section 20.

Through processing performed by the navigation program, the control section 20 sets a plurality of comparison target roads on which the current location of the vehicle may be present on the basis of the autonomous navigation track, which is a track of the position estimated on the basis of the signals output from the vehicle speed sensor 41 and the gyro sensor 42, and the map information 30a, and narrows down the comparison target roads on the basis of an error circle of the GPS signals acquired by the GPS reception section 43. The control section 20 references the map information 30a to perform a map matching process in which a road that best coincides with the autonomous navigation track in shape, among the comparison target roads which have been narrowed down, is estimated as a traveling road on which the vehicle is traveling, and specifies the current location of the vehicle on the traveling road estimated through the map matching process.

Normally, the current location of the vehicle is estimated in a state in which map matching is established in this way. In the case where the vehicle travels on a new road that is not defined in the map information 30a, however, a state in which map matching is not established is established. The control section 20 can recognize the state in which map matching is not established and the state in which map matching is established. In the state in which map matching is not established, the control section 20 estimates the current location without performing map matching. In the embodiment, the control section 20 estimates the position estimated on the basis of the GPS signals as the current location in the state in which map matching is not established. As a matter of course, the control section 20 may estimate the position estimated on the basis of the signals output from the vehicle speed sensor 41 and the gyro sensor 42 as the current location.

The control section 20 acquires a movement track that indicates transition of the current location that can be specified in no reliance on whether or not map matching is successful in both the state in which map matching is established and the state in which map matching is not established. In the embodiment, the control section 20 considers the current location estimated on the basis of the GPS signals as the current location that can be specified in no reliance on whether or not map matching is successful. In the state in which map matching is established, the control section 20 associates the current location estimated on the basis of the GPS signals with information that indicates the state in which map matching is established, and stores the information in the storage medium 30 as movement track information 30b. In the state in which map matching is not established, meanwhile, the control section 20 associates the current location estimated on the basis of the GPS signals with information that indicates the state in which map matching is not established, and stores the information in the storage medium 30 as movement track information 30b.

The map information generation program 21 is a program module that causes the control section 20 to implement a function of adding information that indicates a new road to the map information 30a on the basis of a movement track obtained in the state in which map matching is not established. In order to implement such a function, the map information generation program 21 includes a movement track acquisition section 21a, a movement track correction section 21b, and a new road acquisition section 21c.

The movement track acquisition section 21a is a program module that causes the control section 20 to implement a function of acquiring a movement track of the mobile body. That is, the control section 20 acquires a movement track as a target to be compared with an existing road in order to acquire a new road. In order to acquire a movement track such that a movement track on a new road is included, the control section 20 acquires a movement track for a section between a point at which a change is made from the state in which map matching is established to the state in which map matching is not established and a point at which a change is made from the state in which map matching is not established to the state in which map matching is established, and for sections over a predetermined distance before and after the section.

Specifically, the control section 20 acquires a movement track for a case where the vehicle travels on an existing road, a new road, and an existing road. That is, the control section 20 acquires a movement track of the mobile body for a case where a first state in which map matching is established is followed by a second state in which map matching is not established, which is further followed by a third state in which map matching is established. In the embodiment, a first distance which corresponds to the first state and a third distance which corresponds to the third state have been decided in advance, and the control section 20 references the movement track information 30b to acquire a movement track from the first state to the third state in the case where movement tracks for the first state and the third state, which are associated with information that indicates the state in which map matching is established, are present before and after a movement track for the second state, which is associated with information that indicates the state in which map matching is not established, and the movement track for the first state has the first distance and the movement track for the third state has the third distance. In the embodiment, the third distance which prescribes the movement track for the third state is decided in advance so as to be shorter than the first distance which prescribes the movement track for the first state.

The movement track correction section 21b is a program module that causes the control section 20 to implement a function of correcting the position of a movement track such that the movement track approaches an existing road. In the embodiment, the control section 20 corrects a movement track on the basis of a movement track obtained in the state in which map matching is established, in the movement track acquired through a process performed by the movement track acquisition section 21a (a movement track in which the movement track for the first state, the movement track for the second state, and the movement track for the third state are continuous). At this time, the control section 20 makes a correction such that not only a particular position on the movement track obtained in the state in which map matching is established but also the entire movement track obtained in the state in which map matching is established approach an existing road.

In the embodiment, the control section 20 moves a movement track with the shape of the movement track maintained. To this end, in the embodiment, the control section 20 is configured to linearly move a movement track in a two-dimensional plane formed by an orthogonal two-dimensional coordinate system (e.g. a coordinate system with latitude and longitude as axes) that defines the movement track, and specifies a movement vector that prescribes the movement amount and the movement direction for the movement. At this time, the control section 20 specifies a movement vector that indicates such movement that enables the movement track to be associated with an existing road over the longest distance, and makes a correction such that the position of the movement track is moved using the movement vector.

The new road acquisition section 21c is a program module that causes the control section 20 to implement a function of acquiring a section in which the corrected movement track does not correspond to an existing road as a new road. That is, the control section 20 considers that the mobile body has moved on an existing road in a section in which the corrected movement track and an existing road correspond to each other, and considers that the mobile body has moved on a new road in a section in which the corrected movement track and an existing road do not correspond to each other. The control section 20 considers that the movement track and a new road substantially coincide with each other in a section in which the corrected movement track and an existing road do not correspond to each other, and specifies the position of the new road on the basis of information that indicates the section. The process for acquiring a new road will be discussed in detail later. A new road addition section 21d is a program module that causes the control section 20 to implement a function of adding information that indicates a new road to the map information 30a. That is, the control section 20 generates node data that indicate an end point of the new road acquired through a process performed by the new road acquisition section 21c and link data that indicate the new road, and adds the generated data to the map information 30a. In the case where an end point of the new road coincides with an existing intersection, the control section 20 defines link data such that the new road extends from the existing intersection. In the case where an intersection that is an end point of the new road is present on an existing road, meanwhile, the control section 20 corrects the node data and the link data such that the existing road is split at the intersection. As a result, a process that utilizes a road network that includes a new road, such as a route search process and a route guidance process, for example, can be executed by referencing the map information 30a to which information that indicates the new road has been added.

In the embodiment, the output signal from the GPS reception section 43 and the output signals from the vehicle speed sensor 41 and the gyro sensor 42 are utilized in order to specify the current location of the vehicle. However, such current location specifying means occasionally indicate an inaccurate position because of various factors such as radio disturbance and error accumulation. Therefore, when a focus is placed on the current location of the vehicle specified at a certain moment, the current location of the vehicle is occasionally inaccurate, and if the position of connection between a new road and an existing road is specified on the basis of the current location of the vehicle, the position of the new road is inaccurate.

In this way, the current location of the vehicle at a certain moment, which constitutes a movement track, may be inaccurate. When a focus in placed on the shape of a movement track in a state in which the movement track is shown as transition of the current location of the vehicle, on the other hand, the shape of the movement track is rarely different from a track of the actual position significantly. In the GPS technology, for example, the position may be fluctuated at random because of multipath propagation and noise. When a focus is placed on the movement track which is a collection of a plurality of positions, however, the error is leveled, and the shape of the movement track is rarely different from a track of the actual position significantly. In the embodiment, the control section 20 does not specify the position of connection between a new road and an existing road on the basis of the current location of the vehicle at a certain moment, but specifies a new road after making a correction such that an movement track obtained in the state in which map matching is established approaches an existing road. Therefore, the accuracy in position of the new road can be improved.

In the embodiment, further, through a process performed by the movement track acquisition section 21a, the control section 20 can acquire a movement track such that a movement track obtained before a change is made from the state in which map matching is established to the state in which map matching is not established is longer than a movement track obtained after a change is made from the state in which map matching is not established to the state in which map matching is established, and start analyzing the movement track. Thus, analysis of a movement track can be started early compared to a case where a movement track obtained before a change is made from the state in which map matching is established to the state in which map matching is not established is not longer than a movement track obtained after a change is made from the state in which map matching is not established to the state in which map matching is established.

Further, in a configuration in which the position of a vehicle and a geographical database are matched with each other to decide the splitting position of a link for which matching was previously established from the initial position at which matching is not established to create a new link that has the splitting point as an end point as in Japanese Patent No. 4559551, a new road may be connected to a wrong road in the case where there is a parallel road in proximity to an existing road and a mismatch is made. With a configuration in which a movement track that includes tracks before and after a location at which a change is made between the state in which map matching is established and the state in which map matching is not established is acquired and the movement track is corrected to such a position that the shape of the movement track partially generally coincides with the shape of an existing road as in the embodiment, however, a new road can be specified after associating sections before and after the movement track, in which the vehicle would have traveled on an existing road, and an existing road that is similar in shape to such sections with each other. Thus, the position of a new road can be specified accurately.

(2) Map Information Generation Process

Next, a map information generation process performed by the map information generation program 21 will be described. When the navigation program is executed, the control section 20 executes a map information generation process performed by the map information generation program 21. In the map information generation process, through processing performed by the navigation program, the control section 20 acquires a current location (step S100). That is, the control section 20 acquires a current location of the vehicle on the basis of the signals output from the vehicle speed sensor 41 and the gyro sensor 42. Next, the control section 20 determines whether or not the current location conforms to an existing road (step S105). That is, the control section 20 determines, on the basis of an autonomous navigation track that is a track of the current location acquired in step S100, an error circle indicated by the signal output from the GPS reception section 43, and the map information 30*a*, whether or not map matching in which the autonomous navigation track and a road indicated by the map information 30*a* conform to each other is established.

In the case where it is determined in step S105 that the current location conforms to an existing road, the control section 20 stores movement track information 30*b* that indicates the state in which map matching is established (step S110). That is, the control section 20 associates the current location indicated by the signal output from the GPS reception section 43 with information that indicates the state in which map matching is established, and stores the information in the storage medium as movement track information 30*b*. In the case where it is not determined in step S105 that the current location conforms to an existing road, the control section 20 stores movement track information 30*b* that indicates the state in which map matching is not established (step S115). That is, the control section 20 associates the current location indicated by the signal output from the GPS reception section 43 with information that indicates the state in which map matching is not established, and stores the information in the storage medium as movement track information 30*b*.

Next, through a process performed by the movement track acquisition section 21*a*, the control section 20 determines whether or not an analysis start condition has been met (step S120). That is, the control section 20 references the movement track information 30*b*, and considers that the analysis start condition has been met in the case where a movement path obtained before the current location acquired in step S100 is a movement track obtained in the case where the first state in which map matching is established is followed by the second state in which map matching is not established, which is further followed by the third state in which map matching is established, and the length of the movement track obtained in the first state is the first distance and the length of the movement track obtained in the third state is the third distance.

In the case where it is not determined in step S120 that the analysis start condition has been met, the control section 20 repeats the processes in and after step S100. In the case where it is determined in step S120 that the analysis start condition has been met, on the other hand, through a process performed by the movement track acquisition section 21*a*, the control section 20 acquires a movement track to be analyzed (step S125). That is, the control section 20 references the movement track information 30*b*, and acquires a movement track obtained in the state in which map matching is established before the current location for an amount corresponding to the third distance retrospectively from the current location, further acquires a movement track obtained in the state in which map matching is not established retrospectively, and further acquires a movement track obtained in the state in which map matching is established for an amount corresponding to the first distance retrospectively.

Figure 3:
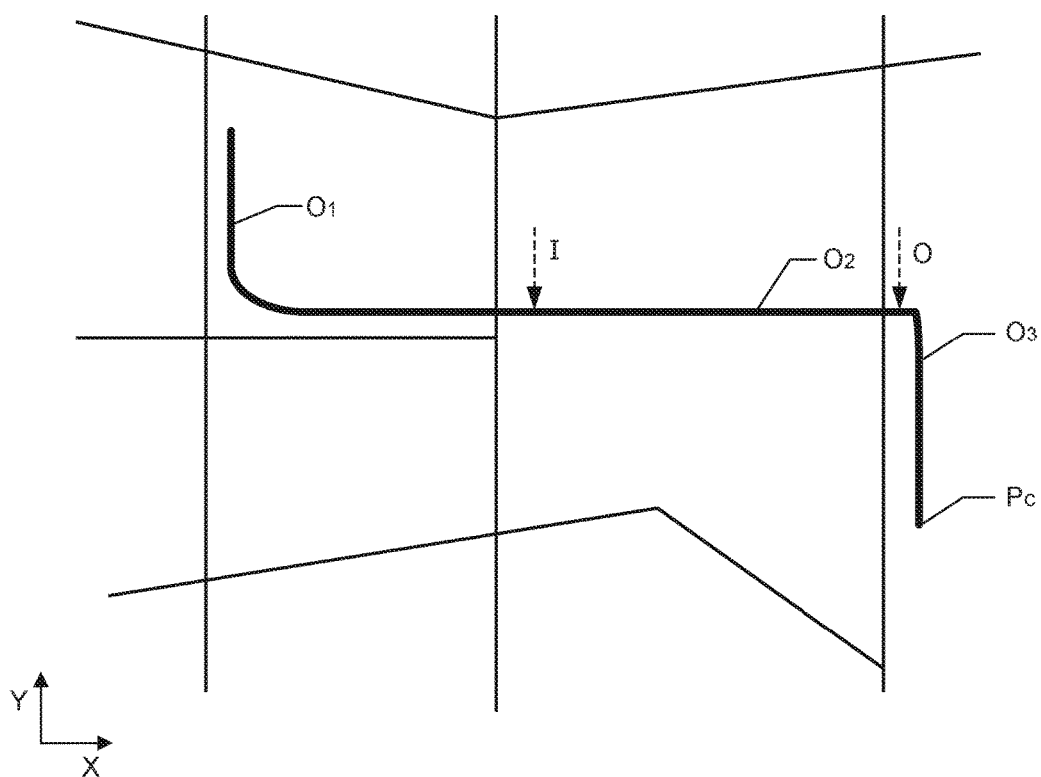
FIG. 3 illustrates an example of roads and a movement track.

In FIG. 3, existing roads are indicated by thin solid lines, and a part of a movement track of the vehicle which is present at a position Pc is indicated by a thick line. In the example, the movement track includes a track obtained in the state in which map matching is established and a track obtained in the state in which map matching is not established. That is, a point indicated by a broken arrow I is the point at which a change is made from the state in which map matching is established to the state in which map matching is not established, and a point indicated by a broken arrow O is the point at which a change is made from the state in which map matching is not established to the state in which map matching is established. Thus, movement tracks $O_1$ and $O_3$ indicate a movement track obtained in the state in which map matching is established, and a movement track $O_2$ indicates a movement track obtained in the state in which map matching is not established. In FIG. 3, in addition, it is assumed that the length of the movement track $O_1$ is the first distance, and that the length of the movement track $O_3$ is the third distance. Thus, the movement tracks $O_1$, $O_2$, and $O_3$ indicated in FIG. 3 are examples of the movement track acquired in step S125.

Next, through a process performed by the movement track correction section 21*b*, the control section 20 specifies a movement vector that indicates such movement that enables the movement track to be associated with an existing road over the longest distance (step S130). A movement vector can be specified by a variety of techniques. For example, the control section 20 specifies a plurality of vectors that move a plurality of points set on the movement track (such as points at constant intervals) to a plurality of points set on an existing road (such as points of intersection with vertical lines that extend from the movement track). Further, the control section 20 specifies one of the plurality of vectors or a statistically decided vector as a trial vector, moves the movement track using the trial vector, and thereafter calculates a distance over which the movement track after being moved and the existing road coincide with each other. The distance may be calculated by extracting from the movement track sections in which the movement track and the existing road are so proximate to each other as to be considered to correspond to each other, and considering the total length of the extracted sections as the distance over which the movement track after being moved and the existing road coincide with each other.

The trial vector may be specified by defining a vector synthesized from a plurality of vectors, or may be specified as a median value, an average value, or the like of components of a plurality of vectors. As a matter of course, weighting may be performed in various ways in specifying a synthesized vector (such as applying a larger weighting coefficient to a shorter vector). In addition, an excessively large vector may not be considered as a trial vector.

A state in which the movement track and an existing road are associated with each other over the longest distance can be generated by executing the process described above for a plurality of trial vectors, and further repeatedly specifying and moving the trial vectors until the distance over which the movement track after being moved and the existing road coincide with each other is maximized. Thus, the control section 20 can specify a movement vector that indicates such movement that enables the movement track to be associated with an existing road over the longest distance by comparing the positions of the movement track after being moved and the movement track before being moved after the distance over which the movement track after being moved and the existing road coincide with each other is maximized.

Figure 4A:
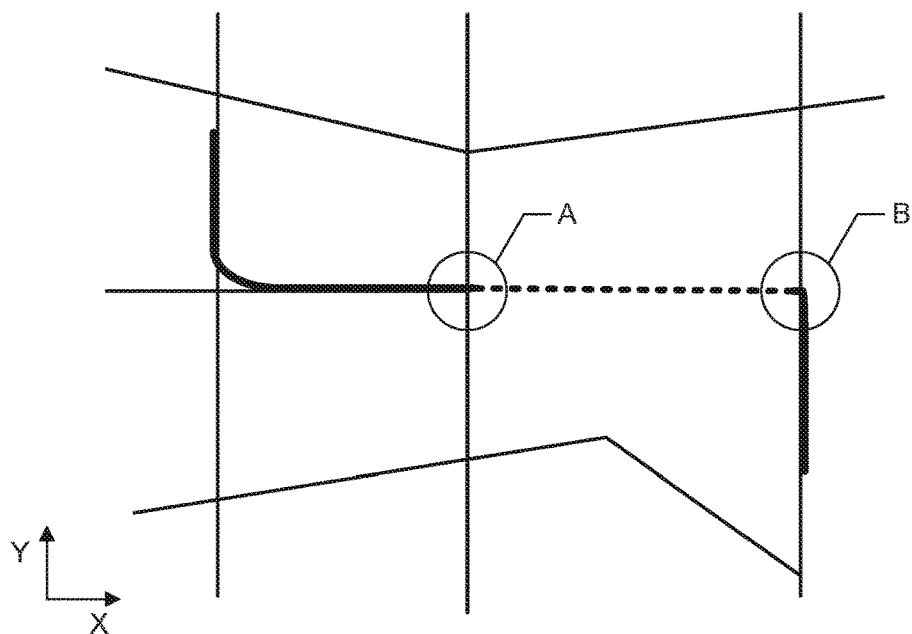
FIG. 4A illustrates movement according to a movement vector, and FIGS. 4B to 4E each illustrate an example in which the position of a new road is acquired.

When a movement vector that indicates such movement that enables the movement track to be associated with an existing road over the longest distance is specified in the manner described above, through a process performed by the movement track correction section 21b, the control section 20 moves the position of the movement track using the movement vector (step S135). That is, the control section 20 corrects the position of the movement track by translating the positions of the movement track acquired in step S125 in accordance with the movement vector. As a result, the movement track acquired in step S125 is moved with the shape of the movement track maintained. FIG. 4A illustrates an example in which the movement track in the example illustrated in FIG. 3 has been moved in accordance with the movement vector.

In this state, the control section 20 performs a process in which a section in which the corrected movement track does not correspond to an existing road is disconnected from the corrected movement track, the disconnected section is moved so as to be connected to the existing road, and the position of the section after being moved is considered as the position of a new road. Specifically, through a process performed by the new road acquisition section 21c, the control section 20 sets track sample points and road sample points (step S140). That is, the control section 20 sets track sample points, which are virtual points, on the movement track corrected in step S135 at predetermined intervals, and sets road sample points, which are virtual points, on an existing road at the predetermined intervals. The predetermined intervals which serve as the intervals between the track sample points and the intervals between the road sample points may only be decided in advance, and may only be decided in accordance with the precision required as the precision for specifying the position of the new road, the resource for analysis, and so forth.

Figure 4B:
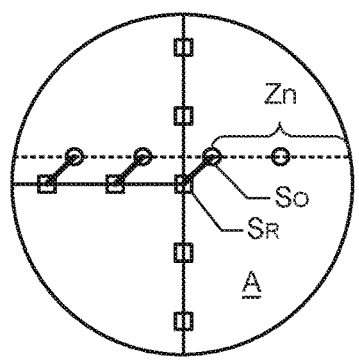
Figure 4C:
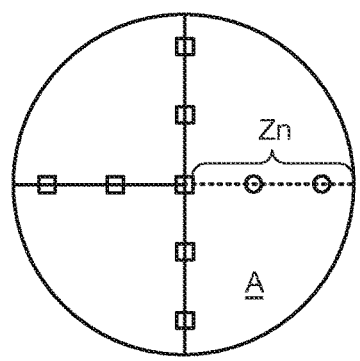
Figure 4D:
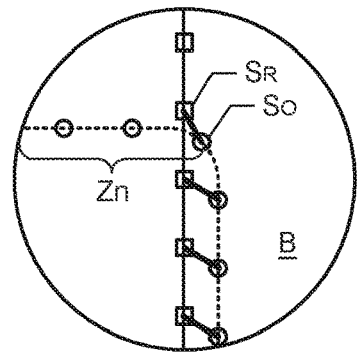
Figure 4E:
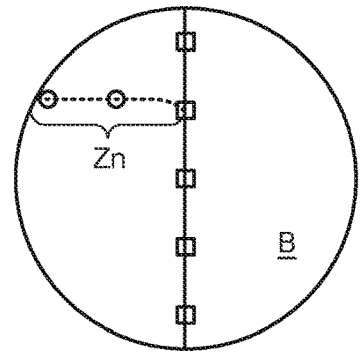

FIGS. 4B and 4C are each an enlarged view of a region A in the example illustrated in FIG. 4A. FIGS. 4D and 4E are each an enlarged view of a region B in the example illustrated in FIG. 4A. In FIGS. 4B to 4D, the existing roads are indicated by solid lines, and the movement track is indicated by a broken line. The new road is not illustrated. The track sample points are indicated by white circles, and the road sample points are indicated by white rectangles.

Next, through a process performed by the new road acquisition section 21c, the control section 20 generates pairs of the track sample points and the road sample points associated with each other (step S145). That is, the control section 20 associates the track sample point and the road sample point that are located at the shortest distance to each other to form a pair of one track sample point and one road sample point. The control section 20 associates each pair with a corresponding identifier, and stores information indicating that the identifier is associated with the track sample point and the road sample point in the RAM. In the case where the road sample point that is the closest from the track sample point and the track sample point that is the closest from the road sample point differ from each other, such sample points are not paired. As a result, the road sample points on the existing road on which the vehicle has traveled are paired with the surrounding track sample points, but the track sample points set to the movement track on the new road are not associated with road sample points.

FIGS. 4B and 4D are each an enlarged view before the movement track is not disconnected and moved as discussed later. In the drawings, the track sample points and the road sample points paired with each other are indicated as connected by thick solid lines. Thick solid lines are not connected to the track sample points not associated with the road sample points. In this way, in the case where no road sample points corresponding to the track sample points are present, a section on the movement track, which is constituted of the track sample points, is estimated as a new road.

Thus, in the embodiment, the control section 20 performs a process for acquiring a new road on the basis of the movement track constituted of the track sample points not associated with the road sample points. Before acquiring a new road, however, the control section 20 makes a correction for accurately specifying a new road. Specifically, through a process performed by the new road acquisition section 21c, the control section 20 determines whether or not a section in which pairs are not formed and the length of which is equal to or less than a threshold is present (step S150). That is, the control section 20 specifies the track sample points on the movement track that are not paired, and in the case where the track sample points that are not paired are present continuously, specifies a section in which such track sample points are present. The control section 20 specifies the length of the section and compares the length with the threshold to determine whether or not a section in which pairs are not formed and the length of which is equal to or less than the threshold is present.

In the case where it is determined in step S150 that a section in which pairs are not formed and the length of which is equal to or less than the threshold is present, through a process performed by the new road acquisition section 21c, the control section 20 integrates the relevant section with a section in which pairs are formed (step S155).

That is, a section in which pairs are not formed and the length of which is equal to or less than the threshold is generated at an intersection at which the movement track of the vehicle is curved and the existing road is straight or the like. However, such a section is on the existing road, and therefore the control section 20 makes a correction such that the relevant section is not estimated as a new road by integrating the relevant section with a section in which pairs are formed. In the case where it is not determined in step S150 that a section in which pairs are not formed and the length of which is equal to or less than the threshold is present, the control section 20 skips step S155.

Further, through a process performed by the new road acquisition section 21c, the control section 20 determines whether or not a section in which pairs are formed and the length of which is equal to or less than the threshold is present (step S160). That is, the control section 20 specifies the track sample points on the movement track that are paired, and in the case where the track sample points that are paired are present continuously, specifies a section in which such track sample points are present. The control section 20 specifies the length of the section and compares the length with the threshold to determine whether or not a section in which pairs are formed and the length of which is equal to or less than the threshold is present.

In the case where it is determined in step S160 that a section in which pairs are formed and the length of which is equal to or less than the threshold is present, through a process performed by the new road acquisition section 21c, the control section 20 integrates the relevant section with a section in which pairs are not formed (step S165). That is, a section in which pairs are formed and the length of which is equal to or less than the threshold is generated in the case where a new road that extends in a direction that is close to that of an existing road is newly built near the existing road or the like. However, such a section is not on the existing road, and therefore the control section 20 makes a correction such that the relevant section is not estimated as the existing road by integrating the relevant section with a section in which pairs are not formed. In the case where it is not determined in step S160 that a section in which pairs are formed and the length of which is equal to or less than the threshold is present, the control section 20 skips step S165.

Next, through a process performed by the new road acquisition section 21c, the control section 20 acquires the section in which pairs are not formed as a new road section (step S170). For example, the control section 20 acquires movement tracks in a section Zn indicated in FIG. 4B and a section Zn indicated in FIG. 4D as new road sections. In the embodiment, as described above, a new road section can be acquired easily on the basis of the correspondence relation between the track sample points and the road sample points.

Further, in a state in which a new road section has been acquired in the manner described above, the new road and the existing road may be discontinuous. Therefore, the control section 20 connects the new road section to an end point of the section in which pairs are formed through a process performed by the new road acquisition section 21c, and stores the connected new road in the map information 30a through a process performed by the new road addition section 21d (step S175). In the embodiment, the control section 20 moves a section on the movement track in which the track sample points not associated with the road sample points are present such that the section is connected to the road sample point that is closest to the section.

For example, in the examples illustrated in FIGS. 4B and 4D, the section on the movement track in which the track sample points not associated with the road sample points are present is a section Zn on the movement track, which is present on the new road side with respect to a track sample point $S_O$ of one of the pairs of track sample points and road sample points that is positioned closest to the new road side. The control section 20 disconnects the section Zn from the movement track, and moves the section Zn so as to be connected to a road sample point $S_R$ that is closest to the section Zn. In general, the directions of movement of both ends ($S_O$ indicated in FIG. 4B and $S_O$ indicated in FIG. 4C) of the section Zn are different from each other. Therefore, the control section 20 may correct the shape of the movement track. The correction can be achieved through an isotropic affine transformation or the like, for example. FIG. 4C illustrates a state in which the section Zn indicated in FIG. 4B has been moved. FIG. 4E illustrates a state in which the section Zn indicated in FIG. 4D has been moved. As described above, when a section on the movement track in which the track sample points not associated with the road sample points are present is moved so as to be connected to the road sample point that is closest to the section, the position of the section after being moved can be considered as the position of a new road. The control section 20 can accurately define the position of a new road by storing the position of the section after being moved in the map information 30a as the position of the new road.

(3) Other Embodiments

The embodiment described above is an example, and a variety of other embodiments can be adopted as long as the position of a movement track is corrected such that the movement track approaches an existing road and thereafter a section corresponding to the movement track after being corrected is acquired as a new road. For example, the map information generation system may be permanently mounted on the vehicle, or may be a portable terminal that can be brought into the vehicle to be utilized. Alternatively, the map information generation system may be constituted of a server or the like that generates map information on the basis of probe information or the like acquired from the vehicle or the like. In this case, as a matter of course, information that indicates a new road added to map information by the server or the like may be distributed to a navigation terminal utilized by the vehicle so that the information that indicates the new road is also added to the map information on the storage medium of the terminal. Further, at least a part of the movement track acquisition section 21a, the movement track correction section 21b, and the new road acquisition section 21c may be implemented by a control subject that is different from that in the embodiment discussed above. For example, the movement track acquisition section 21a may be implemented by a control ECU or the like configured to specify a current location. Further, the mobile body is not limited to a vehicle, and may be a pedestrian or the like.

The movement track acquisition means may only be able to acquire a movement track of a mobile body. The movement track may only be a track obtained in the case where a mobile body is moved from a certain location to another location, and may be all or a part of a track obtained during travel. The movement track may only be a collection of a plurality of positions estimated as the position of a mobile body. The movement track needs to include a movement track on an existing road in order to be compared with the existing road, and preferably includes a movement track on a new road in order to acquire the new road. In the embodiment discussed above, the movement track is a track of the current location acquired on the basis of the signal output from the GPS reception section 43. However, the movement track may only be not a track of a mobile body obtained after map matching, and may be an autonomous navigation track as a matter of course.

The movement track correction means may only be able to correct the position of a movement track such that the movement track approaches an existing road. That is, the movement track correction means may only be able to make a correction such that not only a particular position on a movement track but also the entire movement track approaches an existing road, with a focus placed on the entirety of the movement track acquired by the movement track acquisition means. To this end, the movement track correction means may be configured to move (or rotationally move) a movement track with the shape of the movement track maintained, and may be configured to move a movement track such that the difference between the movement track after being moved and an existing road is minimized, for example.

There may be a plurality of movement methods in which a correction can be made such that a movement track approaches an existing road. A variety of techniques may be adopted to limit the plurality of movement methods to one. For example, a movement track may be moved such that the difference between the movement track after being moved and the existing road is minimized as discussed above, or a movement track may be moved also in consideration of various evaluation conditions. A variety of conditions can be assumed as the evaluation conditions. For example, the plurality of movement methods may be evaluated such that a movement method that involves a smaller amount of movement or a smaller rotational angle of rotational movement is more likely to be adopted as the movement method.

The new road acquisition means may only be able to acquire a section in which the corrected movement track does not correspond to an existing road as a new road. That is, the new road acquisition means considers that the mobile body has moved on an existing road in a section in which the corrected movement track and an existing road correspond to each other, and considers that the mobile body has moved on a new road in a section in which the corrected movement track and an existing road do not correspond to each other. In a section in which the corrected movement track and an existing road do not correspond each other, the new road acquisition means may only consider that the movement track indicates the shape of a new road, and determine the section as a new road.

The determination as to whether or not the corrected movement track corresponds to an existing road may only be made such that at least a state in which the movement track may never be a track on an existing road can be considered as a state in which the corrected movement track and an existing road do not correspond to each other, and not only a state in which the coordinate of the corrected movement track and the coordinate of an existing road perfectly coincide with each other is considered as a state in which the corrected movement track and an existing road correspond to each other. Thus, the corrected movement track and an existing road may be considered to correspond to each other in the case where an existing road that may be (does not contradict with) the corrected movement track is present near the corrected movement track, and the corrected movement track and an existing road may be considered not to correspond to each other in the case where an existing road that may be the corrected movement track is not present near the corrected movement track, for example.

In any event, in the case where a section that cannot be associated with an existing road is present in the corrected movement track as a result of associating the existing road and the corrected movement track with each other, the section may only be acquired as a new road. In a configuration example for such a case, the new road acquisition means may be configured to set track sample points, which are virtual points, on the corrected movement track at predetermined intervals, set road sample points, which are virtual points, on an existing road at predetermined intervals, and in the case where the track sample point and the road sample point that are located at the shortest distance to each other are associated with each other, acquire a new road on the basis of a section on the movement track in which the track sample points not associated with the road sample points are present, for example.

That is, in order to associate an existing road and the corrected movement track with each other, the new road acquisition means is configured to set track sample points on the corrected movement track, and to set road sample points on the existing road. In this way, when the track sample points and the road sample points are set, the correspondence relation can be defined easily by forming pairs of the two types of sample points that are located at the shortest distance to each other. In the case where the correspondence relation is defined, the track sample points that are present on a movement track obtained in the case where the vehicle travels on a new road cannot be associated with the road sample points. Thus, a new road can be acquired on the basis of a section on the movement track in which the track sample points that are not associated with the road sample points are present. With the configuration, a new road can be acquired easily.

The track sample points and the road sample points may only be set at predetermined intervals. That is, the number of sample points in a section in which the movement track and an existing road coincide with each other may only be set so as to be identical in both the movement track and the existing road by making the number of track sample points per unit distance and the number of road sample points per unit distance coincide with each other. With the configuration, a section in which the corrected movement track and the existing road correspond to each other and a section in which the corrected movement track and the existing road do not correspond to each other can be made clear by only defining the correspondence relation between the track sample points and the road sample points.

Further, the new road acquisition means may be configured to move a section on the movement track in which the track sample points not associated with the road sample points are present such that the section is connected to the road sample point that is closest to the section, and consider the position of the section after being moved as the position of a new road. That is, there is a possibility that there is a slight positional deviation between the corrected movement track and an existing road. However, there should be no deviation between an end point of an existing road and an end point of a new road in the actual road network. Thus, when a section on the movement track in which the track sample points not associated with the road sample points are present is moved so as to be connected to the road sample point that is closest to the section, the position of the section after being moved can be considered as the position of a new road. As a result, the position of a new road can be defined accurately.

In a configuration example for moving a movement track such that the difference between the movement track after being moved and an existing road is minimized, the movement track correction means may be configured to make a correction so as to move the position of the movement track using a movement vector that indicates such movement that enables the movement track to be associated with an existing road over the longest distance. That is, if it is assumed that a correction is made such that a movement track is moved in accordance with a movement vector defined by a combination of a movement amount and a movement direction, the degree to which the movement track after being moved is associated with an existing road can be evaluated for each movement vector. Thus, by selecting such a movement vector that enables the movement track after being moved to be associated with an existing road over the longest distance, a movement vector for moving the movement track such that the difference between the movement track after being moved and an existing road is minimized can be specified easily.

Further, the movement track acquisition means may be configured to acquire a movement track for a section between a point at which a change is made from a state in which map matching is established to a state in which map matching is not established and a point at which a change is made from the state in which map matching is not established to the state in which map matching is established, and for sections over a predetermined distance before and after the section. That is, in order to make a correction such that a movement track is moved, the movement track acquisition means may be configured to acquire a movement track that includes tracks obtained in various states in the case where a movement track obtained in the state in which map matching is established, a movement track obtained in the state in which map matching is not established, and a movement track obtained in the state in which map matching is established are continuous. With the configuration, it is possible to analyze a movement track obtained in the case where a transition is made from an existing road to a new road, or a movement track obtained in the case where a transition is made from a new road to an existing road, or a movement track obtained in the case where a transition is made from an existing road to a new road and then to an existing road.

Further, the movement track acquisition means may be configured to acquire a movement track of the mobile body for a case where a first state in which map matching is established is followed by a second state in which map matching is not established, which is further followed by a third state in which map matching is established, as the movement track, and the movement track obtained in the third state may be set to be shorter than the movement track obtained in the first state. For example, in the case where the movement track acquisition means acquires a movement track obtained in the case where a transition is made from an existing road to a new road and then to an existing road as an object to be analyzed, the movement track obtained on the existing road before a transition is made from the existing road to the new road may be longer than the movement track obtained on the existing road after a transition is made from the new road to the existing road. With the configuration, analysis can be started early compared to a case where the movement track obtained on the existing road before a transition is made from the existing road to the new road is not longer than the movement track obtained on the existing road after a transition is made from the new road to the existing road.

Further, the movement track correction means may be configured to estimate a lane in which the mobile body has traveled on an existing road, and to correct the position of a movement track such that the movement track approaches the lane. With the configuration, it is possible to prevent a reduction in precision of determination as to whether or not the movement track and the existing road correspond to each other due to movement of the mobile body between different lanes. A variety of configurations can be adopted as the configuration for estimating a lane in which the mobile body has traveled on an existing road. For example, in the configuration illustrated in FIG. 1, the link data of the map information 30a include information for specifying a lane (such as information that indicates the number of lanes, the width of the lanes, and a pattern of a boundary line between the lanes, for example). Further, if the control section 20 matches information that indicates painting on the road surface, which is acquired using a sensor such as a camera mounted on the vehicle, and the information for specifying a lane indicated in the map information 30a with each other, the position of the lane in which the vehicle is traveling can be specified. Thus, if the control section 20 considers that the position of an existing road is the position of the lane, rather than the center of the road, and corrects the movement track such that the movement track approaches the position of the lane in which the vehicle has traveled, the position of the movement track can be corrected accurately.

In specifying the position of a new road, the position of a new road may be adjusted in accordance with the distance between the lane and the position of the center of the road. For example, the corrected movement track has been moved so as to correspond to the position of the lane. Therefore, in the case where the position of the center of the road is defined as the position of the road in the map information, there is a deviation between the position of the movement track and the position of the center of the road. Thus, the position of the movement track may be corrected so as to eliminate such a deviation to use the corrected position as the position of a new road.

Further, the technique for correcting the position of a movement track such that the movement track approaches an existing road and thereafter acquiring a section that does not correspond to the movement track after being corrected as a new road can also be implemented as a program or a method. The system, program, and method described above includes various aspects such as those implemented using a single device and those implemented utilizing parts that are common to various members provided in the vehicle. For example, a map information management system, navigation system, method, and program that includes the system described above can be provided. Various changes may be made. For example, some units may be implemented using software, and the others may be implemented using hardware. Further, the functions may be implemented as a storage medium for a program that controls the device. As a matter of course, the storage medium for the software may be a magnetic storage medium, a magneto-optical storage medium, or any storage medium that may be developed in the future.

The invention claimed is:

1. A map information generation system, comprising:
a processor programmed to:
acquire a movement track of a mobile body;
correct a position of the movement track such that the movement track approaches an existing road by correcting the entire movement track including the sections before and after a new road;
acquire a section in which the corrected movement track does not correspond to the existing road as the new road; and
add information that indicates the new road to map information.

2. The map information generation system according to claim 1, wherein the processor is programmed to:
make a correction so as to move the position of the movement track using a movement vector that indicates such movement that enables the movement track to be associated with the existing road over the longest distance.

3. The map information generation system according to claim 1, wherein the processor is programmed to:
acquire, as the movement track, a track of the mobile body for a section between a point at which a change is made from a state in which map matching is established to a state in which map matching is not established and a point at which a change is made from the state in which map matching is not established to the state in which map matching is established, and for sections over a predetermined distance before and after the section.

4. The map information generation system according to claim 1, wherein:
the processor is programmed to acquire, as the movement track, a track of the mobile body for a case where a first state in which map matching is established is followed by a second state in which map matching is not established, which is further followed by a third state in which map matching is established; and
the movement track obtained in the third state is shorter than the movement track obtained in the first state.

5. The map information generation system according to claim 1, wherein the processor is programmed to:
set track sample points, which are virtual points, on the corrected movement track at predetermined intervals;
set road sample points, which are virtual points, on the existing road at the predetermined intervals; and
in the case where one of the track sample points and one of the road sample points that are located at the shortest distance to each other are associated with each other, acquire the new road on the basis of a section on the movement track in which the other track sample points that are not associated with the other road sample points are present.

6. The map information generation system according to claim 5, wherein the processor is programmed to:
move a section on the movement track in which the other track sample points that are not associated with the other road sample points are present such that an end point of the section is connected to one of the road sample points that is closest to the section; and
consider a position of the section after being moved as a position of the new road.

7. The map information generation system according to claim 1, wherein the processor is programmed to:
estimate a lane in which the mobile body has traveled on the existing road; and
correct a position of the movement track such that the movement track approaches the lane.

8. The map information generation system according to claim 1, wherein:
the movement track of the mobile body is acquired using map matching; and
the correction of the entire movement track includes undoing the map matching for the sections before and after the new road.

9. A map information generation method, comprising:
acquiring a movement track of a mobile body;
correcting a position of the movement track such that the movement track approaches an existing road by correcting the entire movement track including the sections before and after a new road;
acquiring a section in which the corrected movement track does not correspond to the existing road as the new road; and
adding information that indicates the new road to map information.

10. The map information generation method according to claim 9, wherein:
the movement track of the mobile body is acquired using map matching; and
the correction of the entire movement track includes undoing the map matching for the sections before and after the new road.

11. A computer-readable storage medium storing a computer-executable map information generation program that causes a computer to implement the following functions:
acquiring a movement track of a mobile body;
correcting a position of the movement track such that the movement track approaches an existing road by correcting the entire movement track including the sections before and after a new road;
acquiring a section in which the corrected movement track does not correspond to the existing road as the new road; and
adding information that indicates the new road to map information.

12. The computer-readable storage medium according to claim 11, wherein:
the movement track of the mobile body is acquired using map matching; and
the correction of the entire movement track includes undoing the map matching for the sections before and after the new road.

13. A map information generation system, comprising:
a processor programmed to:
acquire a movement track of a mobile body;
correct a position of the movement track such that the movement track approaches an existing road by:
disconnecting a section in which the corrected movement track does not correspond to the existing road from the corrected movement track;
moving the disconnected section such that the disconnected section is connected to the existing road; and
considering a position of the section after being moved as a position of the new road;
acquire a section in which the corrected movement track does not correspond to the existing road as a new road; and
add information that indicates the new road to map information.

* * * * *